UNITED STATES PATENT OFFICE.

THOMAS H. DUGAN, OF JERSEY CITY, NEW JERSEY.

LIQUID SHELLAC AND PROCESS OF MAKING SAME.

1,303,782. Specification of Letters Patent. Patented May 13, 1919.

No Drawing. Application filed October 15, 1918. Serial No. 258,250.

*To all whom it may concern:*

Be it known that I, THOMAS H. DUGAN, citizen of the United States, residing at Jersey City, in the county of Hudson and State of New Jersey, have invented new and useful Improvements in Liquid Shellac and Processes of Making Same, of which the following is a specification.

The present invention relates to a limitation containing shellac, for use as a liquid coating composition, and to a method of preparing the same.

The use of shellac for coating compositions is old and well known, this material having been found to be very suitable for many purposes. The use of this material is, however, somewhat objectionable in coating compositions of the character heretofore most generally employed since the shellac is ordinarily dissolved either in grain alcohol or in wood alcohol or mixtures containing one or both of these materials such as denatured alcohol, which liquids are open to the objection of being highly inflammable, and of giving off, upon drying, vapors of the alcohol which is objectionable to many people and furthermore, the vapors of methyl alcohol are well known to be extremely deleterious to health, producing vertigo, blindness and sometimes death.

The present invention produces a liquid coating composition comprising shellac by using a solution in water, of borax or other alkali metal borate and potassium bichromate or other alkali metal or other water-soluble salt of chromic acid, the shellac being found to be soluble therein by boiling.

As a specific example of the process to which the invention is not limited, I give the following: Two pounds of gum shellac (which may be the orange shellac or bleached shellac) are mixed with one gallon of water, one pound of borax and $1\frac{1}{4}$ ounces of bichromate of potash (potassium bichromate). The mixture is cooked over a fire at about the boiling point of water until the shellac is thoroughly dissolved, the mixture preferably being stirred during this treatment. Any considerable amount of boiling away from the solution should be compensated for by adding hot or cold water at intervals during the cooking operation. The product may be colored if desired by using any suitable pigment such as ocher, or by the addition of water-soluble or alkali soluble anilin dyes or other dyes of like character, which are soluble in the solution. By the use of dyes transparent varnishes are produced, whereas by the use of pigments, paints are obtained.

The economy in the use of water with the salts mentioned as a substitute for alcohol is obvious.

What I claim is:

1. The herein described liquid coating composition comprising shellac, water, a borate of alkali metal and a bichromate of an alkali metal, in such proportions as to produce a liquid coating composition of varnish-like consistency.

2. The herein described liquid coating composition comprising the ingredients stated in the proportions of approximately:—

Shellac ------------------------------ 2 lbs.
Water -------------------------------- 1 gal.
Borax -------------------------------- 1 lb.
Alkali metal bichromate -------------- $1\frac{1}{4}$ ozs.

3. The herein described process which comprises cooking together shellac, water, a soluble borate and a soluble salt of chromic acid, in such proportions as to produce a liquid coating composition of varnish-like consistency.

In testimony whereof I affix my signature.

THOMAS H. DUGAN.